(12) United States Patent
Raggam et al.

(10) Patent No.: US 8,494,446 B2
(45) Date of Patent: Jul. 23, 2013

(54) TRANSMITTING CIRCUIT FOR A CONTACTLESS COMMUNICATING COMMUNICATION PARTNER DEVICE

(75) Inventors: Peter Raggam, St. Stefan Im Rosental (AT); Erich Merlin, Gratkorn (AT)

(73) Assignee: NXP B.V., Eindhoven (NL)

( * ) Notice: Subject to any disclaimer, the term of this patent is extended or adjusted under 35 U.S.C. 154(b) by 1043 days.

(21) Appl. No.: 11/631,808

(22) PCT Filed: Jun. 30, 2005

(86) PCT No.: PCT/IB2005/052180
§ 371 (c)(1),
(2), (4) Date: Sep. 23, 2010

(87) PCT Pub. No.: WO2006/006104
PCT Pub. Date: Jan. 19, 2006

(65) Prior Publication Data
US 2011/0014883 A1    Jan. 20, 2011

(30) Foreign Application Priority Data
Jul. 6, 2004 (EP) .................................... 04103201

(51) Int. Cl.
*H04B 5/00* (2006.01)
(52) U.S. Cl.
USPC ............. 455/41.1; 455/39; 455/73; 340/10.1; 340/10.4; 343/867; 343/868
(58) Field of Classification Search
USPC ............. 455/39, 41.1, 73, 80; 340/10.1, 10.4; 343/867, 868
See application file for complete search history.

(56) References Cited

U.S. PATENT DOCUMENTS

| 6,427,065 B1 * | 7/2002 | Suga et al. ................. 455/41.1 |
| 6,559,754 B1 * | 5/2003 | Amtmann ................. 340/10.51 |
| 6,640,090 B1 | 10/2003 | Kitahara et al. |

FOREIGN PATENT DOCUMENTS

JP    2000 216715    8/2000

OTHER PUBLICATIONS

"TS 102 190 V1.1.1—Near Field Communication (NFC) IP-1; Interface and Protocol (NFCIP-1)", ETSI, 61 pgs, retrieved from the internet at: www.etsi.org/deliver/etsi_ts/102100 . . ./ts_102190v010101p.pdf, (Mar. 2003).

* cited by examiner

*Primary Examiner* — Tuan H Nguyen

(57) ABSTRACT

In a communication partner device (1) intended for the contactless transmission of digital data to be transmitted having a transmission circuit (2), the transmission circuit (2) comprises a modulation circuit (17) for the amplitude modulation of a carrier signal (CS), which modulation circuit (17) comprises a circuit stage (20, 20') for producing a plurality of different resistance values (RW 1, RW 1') that act on a signal output (TX1, TX2), which resistance values (RW1, RW1') can be transformed, by means of a signal processing circuit (3) arranged to transform resistance values that belongs to the communication partner device (1), into transformed resistance values (RW2, RW2'), which transformed resistance values (RW2, RW2') are responsible for damping a transmission coil (7) of the communication partner device (1) when modulated low-level carrier signal sections are generated in a modulated carrier signal.

5 Claims, 3 Drawing Sheets

TRANSMITTING CIRCUIT FOR A CONTACTLESS COMMUNICATING COMMUNICATION PARTNER DEVICE

FIELD OF THE INVENTION

The invention relates to a transmission circuit for a communication partner device intended for the contactless transmission of data to be transmitted, with which communication partner device a transmitting mode of operation is possible, a carrier signal being subjected, in the transmitting mode, to amplitude modulation of a given degree of modulation in accordance with the data to be transmitted and a modulated carrier signal having unmodulated carrier signal sections and modulated carrier signal sections being obtained as a result, and which communication partner device has a signal processing circuit connected to the transmission circuit and a transmission coil connected to the signal processing circuit, which signal processing circuit is designed to transform resistance values, and which transmission circuit has a carrier-signal generator for generating the carrier signal, a modulation-control circuit for generating modulation-control signals that take account of the data to be transmitted, a modulation circuit for modulating the carrier signal as a function of the modulation-control signals and for generating the modulated carrier signal, and a signal output for emitting the modulated carrier signal, which signal output is intended to supply the signal processing circuit, the modulation circuit containing a circuit stage, which circuit stage is designed to produce a resistance value that acts on the signal output and can be transformed by means of the signal processing circuit.

The invention further relates to a communication partner device having a transmission circuit, a transmission coil, and a signal processing circuit that is provided between the transmission circuit and the transmission coil and is connected to the transmission circuit, which signal processing circuit is designed to transform resistance values.

BACKGROUND OF THE INVENTION

A communication partner device of the kind specified in the second paragraph above having a transmission circuit of the kind specified in the first paragraph above has been put on the market in a number of variant designs by the applicants and the device and circuit in question are therefore known. In the known communication partner device, the transmission circuit is formed by an integrated circuit or IC, which IC also includes or forms a receiving circuit and has been put on the market by the applicants under the type number MF RC 500. The IC used as a transmission circuit has two transmit signal outputs. Connected to each of the two transmit signal outputs is a transmit signal input of a signal processing circuit. The signal processing circuit includes a filter stage that comprises inductors and capacitors and is arranged to form a so-called EMC filter that is intended to ensure the electromagnetic compatibility laid down by the authorities. Connected to the filter stage is a matching stage of the signal processing circuit that comprises a combination of series capacitors and parallel capacitors and by means of which the impedance of a transmission coil connected to the signal processing circuit can be transformed to a given desired value. Connected to the matching stage is a damping stage of the signal processing circuit that is formed by means of two resistors, the above-mentioned transmission coil being connected to the damping stage. The quality factor of the transmission coil can be reduced to a required desired value by means of the damping stage. In the known design, the signal processing circuit comprises, in essence, only inductors and capacitors and the signal processing circuit is suitable and designed/arranged for transforming resistance values, with the transformation of resistance values affecting not only resistance values proper (the real part) but also values of reactance (the imaginary part).

In the known design, the modulation stage for modulating the carrier signal has two series circuits comprising firstly a plurality of PMOS transistors connected in parallel and secondly a plurality of NMOS transistors connected in parallel, with the plurality of PMOS transistors connected in parallel in each of the two series circuits being able to be controlled, in respect of the total resistance of the main current paths of the PMOS transistors which are connected in parallel, between a plurality of different values for this resistance, whereas the plurality of NMOS transistors connected in parallel in each of the two series circuits can be controlled, in respect of the total resistance of the main current paths of the NMOS transistors which are connected in parallel, only between a conductive state of conduction and a blocked state of conduction. Amplitude modulation (ASK modulation) can be performed with the help of the modulation stage to obtain a modulated carrier signal having high-level carrier signal sections and low-level carrier signal sections. To generate the high-level carrier signal sections, what is done in cyclic succession is that, during a first half-cycle of the carrier signal, all the PMOS transistors are controlled to their conductive state of conduction and at the same time all the NMOS transistors are controlled to their blocked state of conduction and, during a second half-cycle of the carrier signal, all the PMOS transistors are controlled to their blocked state of conduction and at the same time all the NMOS transistors are controlled to their conductive state of conduction. To generate the low-level carrier signal sections in the case of 100% ASK modulation, all the PMOS transistors are controlled to their blocked state of conduction and at the same time all the NMOS transistors are controlled to their conductive state of conduction for the entire length of each low-level carrier signal section. In the last-mentioned case, i.e. when the low-level carrier signal sections are generated, the very low level of resistance that is produced by means of the conductive NMOS transistors and that acts on the signal outputs is transformed, by the signal processing circuit arranged to transform resistance values, to a relatively high resistance value at the transmission coil. However, where a fast drop of the voltage present at the transmission coil is required to allow as high as possible a data transmission rate to be achieved, such a high resistance value at the transmission coil opposes and is a hindrance to any such fast drop of the voltage present at the transmission coil, which means that with a transmission coil having a high quality factor of the kind required to achieve a relatively low data transmission rate of, for example, 106 kbaud, transmission of data at an appreciably higher data transmission rate of, for example, 848 kbaud is not possible. Also, in the known design, the ratio in which the signal processing circuit transforms resistance depends on the values of components, i.e. the values of the components of the signal processing circuit, namely the components of the filter stage and the matching stage, which means that, depending on the existing values of the inductances of the inductors and of the capacitances of the capacitors, which values are subject to production-related scatter, the ratios that occur for the transformation of resistance differ. The result of this is that different transformed resistance values at the transmission coil are possible, and do in fact occur, in different communication partner devices, and as a result different damping ratios relating to the damping of the particular transmission coil exist in different communication partner devices, which is a disadvantage from the point of view of a fast change, and in particular a fast drop, in amplitude levels in the amplitude-modulated transmit signal fed to the transmission coil, and from the point of view of a fast change which is as nearly the same as possible in different communication partner devices.

OBJECT AND SUMMARY OF THE INVENTION

It is an object of the invention to overcome the problems that occur in a known transmission circuit and a known communication partner device and to provide an improved transmission circuit and an improved communication partner device.

To achieve the object described above, features according to the invention are provided in a transmission circuit according to the invention, thus enabling a transmission circuit according to the invention to be characterized in the manner specified below, namely:

A transmission circuit for a communication partner device intended for the contactless transmission of data to be transmitted, with which communication partner device a transmitting mode of operation is possible, a carrier signal being subjected, in the transmitting mode, to amplitude modulation of a given degree of modulation in accordance with the data to be transmitted, and a modulated carrier signal having unmodulated carrier signal sections and modulated carrier signal sections being obtained as a result, and which communication partner device has a signal processing circuit connected to the transmission circuit and a transmission coil connected to the signal processing circuit, which signal processing circuit is designed to transform resistance values, and which transmission circuit has a carrier-signal generator for generating the carrier signal, a modulation-control circuit for generating modulation-control signals that take account of the data to be transmitted, a modulation circuit for modulating the carrier signal as a function of the modulation-control signals and for generating the modulated carrier signal, and a signal output for emitting the modulated carrier signal, which signal output is intended to supply the signal processing circuit, the modulation circuit containing a circuit stage, which circuit stage is designed to produce a resistance value that acts on the signal output and can be transformed by means of the signal processing circuit, wherein the circuit stage is designed to be controllable to produce a plurality of different resistance values that act on the signal output, wherein the modulation-control circuit is designed to generate different modulation-control signals that are assigned to the different resistance values, and wherein each of the different resistance values is produced as a result of the different modulation-control signals that are assigned to the resistance value concerned being fed to the circuit stage.

To achieve the object described above, features according to the invention are provided in a communication partner device according to the invention, thus enabling a communication partner device according to the invention to be characterized in the manner specified below:

A communication partner device having a transmission circuit, a transmission coil, and a signal processing circuit that is provided between the transmission circuit and the transmission coil and is connected to the transmission circuit, which signal processing circuit is designed to transform resistance values, wherein the communication partner device includes a transmission circuit according to the invention that is characterized as above.

What is achieved by the provision of the features according to the invention, easily and at only a small additional cost, is that the resistance value that acts on a signal output of the transmission circuit when the modulated low-level carrier signal sections generated in the course of the modulation of the carrier signal can be set to a resistance value that is selected from a plurality of resistance values. In this way, it becomes possible, when the modulated low-level carrier signal sections are generated, for a resistance value of this kind that acts on a signal output to be caused to act in such a way that, due to the transformation of resistance produced by the signal processing circuit having resistance-transforming properties, a resistance value that is relatively low, and hence advantageous, as compared with the known prior art, is ensured in the region of the transmission coil connected to the signal processing circuit, thus making it possible for a voltage present at the transmission coil to drop in an advantageously fast manner, by which means a high data transmission rate can be achieved even when the transmission coil provided is one that has a high quality factor that is intended, per se, for the transmission of data at a relatively low rate. A further advantage that is obtained with a design according to the invention is that, for each signal processing circuit that is connected to the signal output and the resistance-transforming ratio of which depends on the impedances of its components, it becomes possible to set a resistance value acting on the signal output that is matched to the resistance-transforming ratio concerned, which means that on the basis of the resistance value set in the given case and the resistance-transforming ratio of the signal processing circuit, virtually the same transformed resistance value is ensured at the respective transmission coils in all the communication partner devices, which in turn means that optimum damping conditions for the transmission coil exist in all the communication partner devices and optimum characteristics in respect of change in amplitude are obtained as a result. In a design according to the invention, it is possible for detection means for determining the characteristics in respect of change in amplitude to be provided in the region of the transmission coil and, as a function of the result of the determination by the detection means, for the modulation-control circuit to be acted on in respect of the generation of modulation-control signals, and hence for the resistance value acting on a signal output of the transmission circuit to be acted on.

In a transmission circuit according to the invention, the modulation circuit may have at least one controllable diode as a circuit stage for producing a plurality of resistance values acting on the signal output. What has proved very advantageous however is for the modulation stage to contain, as a circuit stage for producing a plurality of resistance values acting on the signal output, at least one transistor the main current path of which is connected on the one hand to the signal output and on the other hand to a reference potential and by means of the main current path of which different resistance values can be produced. This is advantageous with a view to as finely graduated as possible a control of the resistance value acting on the signal output of the transmission circuit.

The transistor may be a bipolar transistor. What has proved particularly advantageous however is for the circuit stage for producing a plurality of different resistance values acting on the signal output to have a plurality of NMOS transistors connected in parallel with one another. What is obtained in this way is a solution that is highly advantageous for implementation in the form of integrated circuitry.

In a solution in which the circuit stage has a plurality of NMOS transistors connected in parallel, it has proved highly advantageous if the plurality of NMOS transistors connected in parallel with one another are connected in series with a plurality of PMOS transistors connected in parallel with one another, which PMOS transistors are intended to produce a plurality of further different resistance values acting on the signal output, are connected by their main current paths on the one hand to the main current paths of the NMOS transistors that are connected in parallel with one another and on the other hand to a source of d.c. voltage, and are controllable by means of the modulation-control circuit. What is advantageously achieved in this way is that the energy that can be and is emitted can, in addition, be easily and precisely acted on.

These and other aspects of the invention are apparent from and will be elucidated with reference to the embodiments described hereinafter, to which however the invention is not limited.

DESCRIPTION OF EMBODIMENTS

Figure 1:
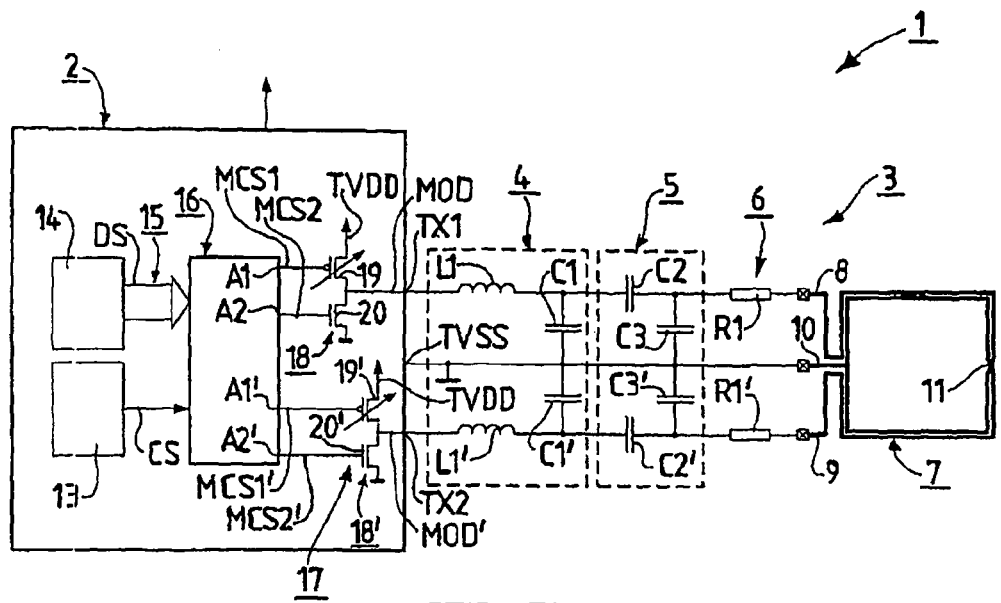
FIG. 1 shows, partly schematically, in the form of a circuit diagram, a communication partner device conforming to the known prior art that includes a signal processing circuit conforming to the known prior art.

FIG. 1 shows a known communication partner device 1 that conforms to the known prior art. The communication partner device 1 is intended and designed and arranged, respectively, for contactless communication with other communication partner devices of at least substantially the same design. Both a transmitting mode of operation and a receiving mode of operation are possible with the communication partner device 1 but only the components that are required for the transmitting mode are shown in FIG. 1. Digital data to be transmitted can be transmitted to other communication partner devices with the communication partner device 1.

In a way that has long been known in expert circles and is also laid down in various standards, such as, for example, in standard ISO 14443 or ISO 15693 or ISO 18092, in given transmitting modes a carrier signal of a given operating frequency is subjected to amplitude modulation at a given modulation frequency with a given degree of modulation, namely with a degree of modulation of 100%. As a result of the amplitude modulation of the carrier signal, a modulated carrier signal is obtained, which modulated carrier signal contains, in alternating succession, unmodulated high-level carrier signal sections and modulated low-level carrier signal sections, with the original carrier signal being present at its full amplitude in the unmodulated carrier signal sections and being present at an amplitude so small as to be negligible, or not being present at all, in the modulated carrier signal sections. In amplitude modulation of this kind, it is most essential that the transitions from the unmodulated high-level carrier signal sections to the modulated low-level carrier signal sections, i.e. the transitions from the full amplitude of the carrier signal to a carrier-signal amplitude that has virtually ceased to exist, take place very quickly, and that the transitions from the modulated low-level carrier signal sections to the unmodulated high-level carrier signal sections also take place very quickly, because it is only with signal transitions that are as steep as possible that data transmission rates that are as high as possible can be achieved.

The communication partner device 1 contains a transmission circuit 2, which transmission circuit 2 is intended and arranged/designed, in the transmitting mode, to handle digital data to be transmitted. In the present case, the transmission circuit 2 is indicated schematically by a block. The transmission circuit 2 is in fact an integrated circuit (IC), which in the present case includes a microprocessor, a cryptographic circuit, a status/control circuit, a data processing circuit and an analog-signal processing circuit. What is provided as a transmission circuit 2 in the present case is the IC that is marketed by the applicants under the type number MF RC 500. What may also be used in the communication partner device 1 however are other commercially available ICs and also ones that are not yet commercially available but that the applicants have under development.

The transmission circuit 2 has two transmit signal outputs TX1 and TX2 and an IC port TVSS associated with the two transmit signal outputs TX1 and TX2.

The communication partner device 1 also has a signal processing circuit 3 that is connected to the transmission circuit 2, namely to the two transmit signal outputs TX1 and TX2 and the IC port TVSS. The signal processing circuit 3 is intended and arranged to process analog signals. The signal processing circuit 3 has a filter stage 4 connected to the transmission circuit, a matching stage 5 connected downstream of the filter stage 4, and a damping stage 6 connected downstream of the matching stage 5. The filter stage 4 contains two series inductors L1 and L1' and two parallel capacitors C1 and C1'. In respect of their values, the components of the filter stage 4 are selected in such a way that the filter stage 4 has a resonant frequency that corresponds to the operating frequency. In the present case the value of the operating frequency is selected to be 13.56 MHz. A modulation frequency is related to a data rate of 106 kbaud in this case. These values of frequency and this data rate are included in standard ISO 14443 and standard ISO 18092. A plurality of modulation frequencies are defined in these standards such as, say, 106 kHz, 212 kHz, 424 kHz and 848 kHz. The filter stage 4 is intended as what is referred to as an EMC stage, where the abbreviation EMC stands for "electromagnetic compatibility".

The matching stage 5 has two series capacitors C2 and C2' and two parallel capacitors C3 and C3'. What is achieved with the matching stage 5 is that the impedance of a transmission coil 7 connected to the damping stage 6 is set to a given desired value, thus enabling as optimum as possible a match of the transmission coil 7 to the signal processing circuit 3, and consequently as optimum as possible a transmission of energy, to be ensured.

The damping stage 6 contains two series resistors R1, R1'. By means of the two series resistors R1, R1', the quality factor of the transmission coil 7 is reduced to a desired value that is wanted. What is selected as a desired value in the present case is a value of 30.

The transmission coil 7 has a first coil terminal 8, a second coil terminal 9 and a third coil terminal 10. The third coil terminal 10 is what is referred to as a ground terminal that is connected to the IC port TVSS, which IC port TVSS is connected to ground. In the present case, the transmission coil 7 is arranged to be two-sided and also symmetrical with respect to the third coil terminal 10, for which purpose the transmission coil 7 is provided with a cross-over 11. By means of the transmission coil 7, a magnetic field can be transmitted in the transmitting mode. If a transmission coil of another communication partner device 1 is in, or is brought into, inductive, i.e. transformer-type, coupling with the transmission coil of the communication partner device 1, this results in a signal being generated in the other transmission coil. To the said other coil, it is possible for digital data to be transmitted from the communication partner device 1 to the other communication partner device. In a similar way, it is also possible for data to be transmitted in the other direction, i.e. when the communication partner device 1 is in the receiving mode, but this will not be described in detail here.

With regard to the signal processing circuit 3, it should also be mentioned that the signal processing circuit 3 comprises essentially, i.e. apart from the two damping resistors R1, R1' provided immediately upstream of the transmission coil 7, only inductors and capacitors, i.e. only reactances. What is achieved as a result of this arrangement is that the signal processing circuit 3 is suitable for transforming resistance values, so doing by enabling relatively high resistance values that occur at the signal inputs of the signal processing circuit 3, that is to say, with respect to the IC port TVSS, at the signal outputs TX1, TX2 of the transmission circuit 2, into relatively low resistance values on the output side of the signal processing circuit 3, as indicated schematically by an arrow 12 in FIG. 2.

The transmission circuit 2 includes a carrier-signal generator 13 for generating a carrier signal CS. The transmission circuit 2 also includes a data-signal source 14, which data-signal source 14 emits data signals DS along a connecting bus 15.

The transmission circuit 2 further includes a modulation-control circuit 16 for generating modulation-control signals. The modulation-control circuit 16 is connected downstream of the carrier-signal generator 13 and the data-signal source 14 and is intended and arranged to process the carrier signal CS and the data signals DS. Using the carrier signal CS and the data signals DS, the modulation-control circuit 16 generates modulation-control signals that are emitted from the four outputs A1, A2, A1', A2'. The modulation-control circuit 16 emits a first modulation-control signal MCS1 from the first output A1, a second modulation-control signal MCS2 from the second output A2, a third modulation-control signal MCS1' from the third output A1', and a fourth modulation-control signal MCS2' from the fourth output A2'.

The transmission circuit 2 further includes a modulation circuit 17 for modulating the carrier signal CS as a function of the modulation-control signals MCS1, MCS2, MCS 1' and MCS2' and for generating each of two modulated carrier signals MOD, MOD', which modulated carrier signals MOD, MOD' are emitted from the two signal outputs TX1 and TX2. The modulation circuit 17 contains a first series circuit 18 comprising a first PMOS stage 19 and a first NMOS stage 20, and a second series circuit 18' comprising a second PMOS stage 19' and a second NMOS stage 20'. The two PMOS stages 19, 19' comprise, in the present case, a plurality of PMOS transistors connected in parallel with one another, which are indicated schematically in FIG. 1 as only a single PMOS transistor. The two NMOS stages 20, 20' each comprise only a single NMOS transistor. In the case of the PMOS stages 19, 19', by driving them in the appropriate way by means of the modulation-control signals MCS1, MCS1, which modulation-control signals MCS1, MCS1' can be fed to the PMOS transistors via a plurality of lines corresponding to the plurality of PMOS transistors, it is easily possible for the total resistance set up by the plurality of PMOS transistors connected in parallel with one another to be controlled to different resistance values. The PMOS transistors are intended to produce a plurality of further different resistance values acting on the signal outputs TX1, TX2. The PMOS transistors are connected by their main current paths on the one hand to the main current paths of the single NMOS transistors in the NMOS stages 20, 20' and on the other hand to a source TVDD of d.c. voltage. By means of the PMOS transistors in the PMOS stages 19, 19', it is possible for the output power of the modulated carrier signals MOD, MOD' emitted from the signal outputs TX1, TX2 to be controlled.

Figure 2:
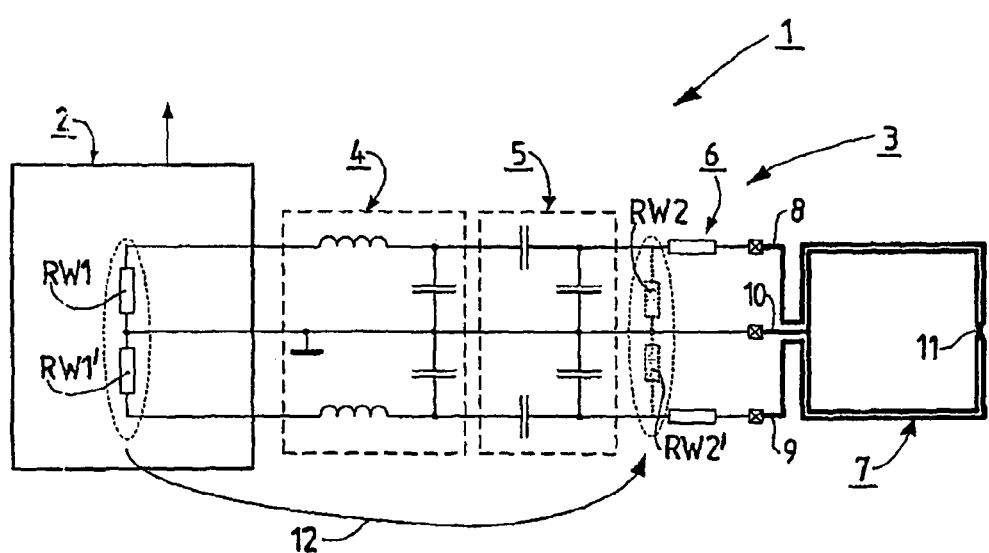
FIG. 2 shows, in a similar way to FIG. 1, the communication partner device shown in FIG. 1, with a modulation circuit being shown in the form of an equivalent circuit diagram for a particular mode of operation.

In the modulation circuit 17, the two NMOS stages 20, 20' each form a circuit stage, which circuit stage is arranged to produce a resistance value RW1, RW1' which acts on the relevant signal output TX1, TX2, which resistance value RW1, RW1' can be transformed by means of the signal processing circuit 3, between the input side of the signal processing circuit 3 and the output side of the signal processing circuit 3, which takes place to a resistance value RW2, RW2', as is indicated schematically in FIG. 2 by the arrow 12.

In the case of the communication partner device 1 conforming to the known prior art which is shown in FIG. 1 and FIG. 2, the resistance values RW1, RW1' produced by means of the NMOS stages 20, 20' are fixed, invariable values. This means that the transformed resistance values RW2, RW2' are fixed too, so that the damping effect that is possible on the transmission coil 7 is also only fixed and invariable. This gives rise to the problems and disadvantages that were explained at the beginning of the description, which it is an object of the invention to solve and overcome. What has been found as a way of achieving the said object is a transmission circuit 2 according to the invention, which will be described below by reference to the communication partner device 1 shown in FIG. 3.

Figure 3:
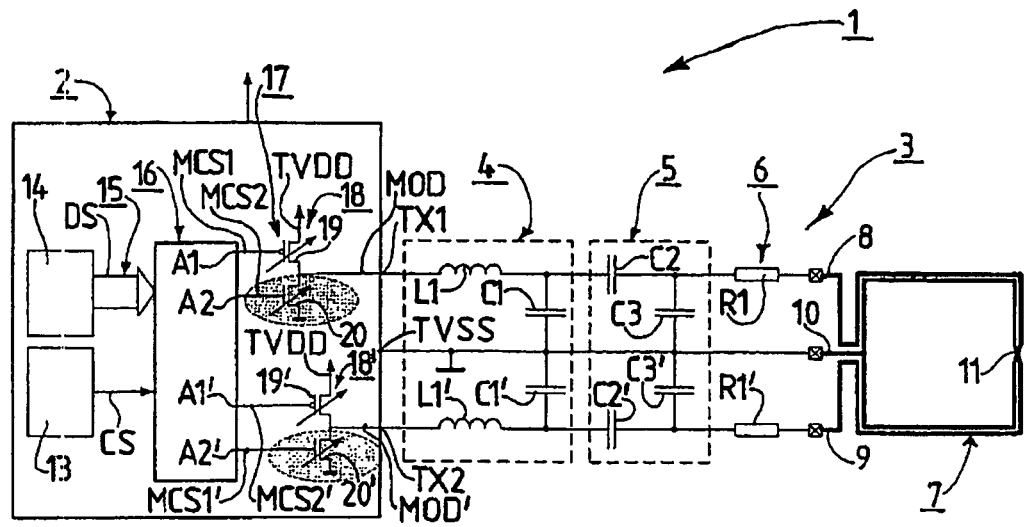
FIG. 3 shows, in a similar way to FIG. 1, a communication partner device according to one embodiment of the invention, which includes a signal processing circuit according to a first embodiment of the invention.

FIG. 3 shows a communication partner device 1 according to the invention. The communication partner device 1 according to the invention has a transmission circuit 2 according to the invention. The communication partner device 1 and transmission circuit 2 according to the invention are of similar construction to the communication partner device 1 and transmission circuit 2 conforming to the known prior part, but there is an essential difference in the transmission circuit 2 according to the invention as compared with the transmission circuit 2 conforming to the known prior art, which essential difference affords advantages according to the invention.

Figure 4:
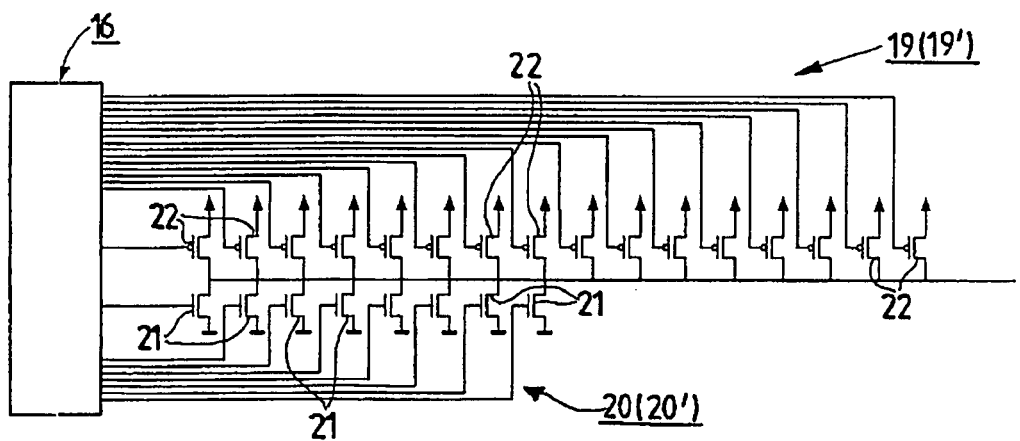
FIG. 4 shows an actual design of a circuit stage for a modulation circuit of the communication partner device shown in FIG. 3.

In the case of the transmission circuit 2 according to the invention, the NMOS stages 20, 20', i.e. the circuit stages for producing a resistance value RW1, RW1' that acts on the relevant signal output TX1, TX2 and can be transformed by means of the signal processing circuit 3, are arranged to be controllable to produce a plurality of different resistance values that act on the relevant signal output TX1, TX2. In the present case, the NMOS stages 20, 20' are formed by sixteen (16) NMOS transistors 21 connected in parallel with one another, as can be seen in detail in FIG. 4, although the number of NMOS transistors 21 shown in FIG. 4 is only eight (8). The PMOS stages 19, 19' comprise a total of sixty-four

(64) PMOS transistors 22 connected in parallel with one another, although the number of PMOS transistors 22 shown in FIG. 4 is only sixteen (16). Each of the NMOS transistors 21 and each of the PMOS transistors 22 are connected to the modulation-control circuit 16 via a control line. The modulation-control circuit 16 is advantageously arranged to generate different modulation-control signals assigned to the different resistance values RW1, RW1'. By means of the different modulation-control signals, parallel configurations of PMOS transistors 22 comprising different numbers of PMOS transistors 22 and parallel configurations of NMOS transistors 21 comprising different numbers of NMOS transistors 21 can be brought into being by driving the PMOS transistors 22 and the NMOS transistors 21 in the appropriate way. This makes it possible, by means of the parallel configuration of PMOS transistors that is brought into being in the given case, to obtain different amplitudes in modulated carrier signals MOD, MOD' and consequently different output powers. However, by bringing into being different parallel configurations of NMOS transistors 21, what this also makes possible, in addition, is for different resistance values RW1, RW1' to be obtained. Of the plurality of different resistance values RW1, RW1', any desired one that is produced by an NMOS stage 20, 20' and that acts on a signal output TX1, TX2 can be obtained as a result of the different modulation-control signals MCS1, MCS2, MCS1', MCS2' assigned to the relevant resistance value RW1, RW1' being fed to the relevant NMOS stage 20, 20'. The modulation-control signals MCS1, MCS1' comprise in this case a total of sixty-four (64) switching signals, namely one switching signal per PMOS transistor 22. The modulation-control signals MCS2, MCS2' comprise in this case a total of sixteen (16) switching signals, namely one switching signal per PMOS transistor 21. As indicated schematically by the arrow 12 in FIG. 2, the different resistance values RW1, RW1' able to be produced by means of the NMOS stages 20, 20' are able to be transformed, by means of the signal processing circuit 3 arranged for transforming all the different resistance values, in the direction leading to the transmission coil 7.

All the PMOS transistors 22 may be of the same kind, which means that their main current paths are nominally of equal resistance values. All the NMOS transistors 21 may likewise be of the same kind, which means that their main current paths too are nominally of equal resistance values. However, it is also possible, and may, when necessary, be advantageous, to have an arrangement in which the NMOS transistors 21 and the PMOS transistors 22 are not the same as one another, namely are arranged to be weighted in respect of the value of the resistance of their main current paths. It is also possible for the PMOS transistors 22 and the NMOS transistors 21 to be combined into groups, with each group comprising a given number of PMOS transistors 22 or NMOS transistors 21 and all the transistors in a group being controllable from the modulation-control circuit 16 via only one control line. The groups may all contain the same number of transistors, such as two (2) or four (4) transistors for example. The groups may however also contain different numbers of transistors, e.g. 1, 2, 4, 8, 16 or 32 and 1, 2, 4 or 8 in the respective cases.

The advantages that have already been described above are achieved in accordance with the invention by means of the transmission circuit 2 according to the invention that is shown in FIG. 3. What is particularly essential in this case is that a beneficial action on the quality factor of the transmission coil 7 should be obtained during the modulation of the carrier signal to generate the modulated low-level sections of the carrier signal, to ensure that the signal voltage arising at the transmission coil 7 drops or decays particularly fast.

Figure 5:
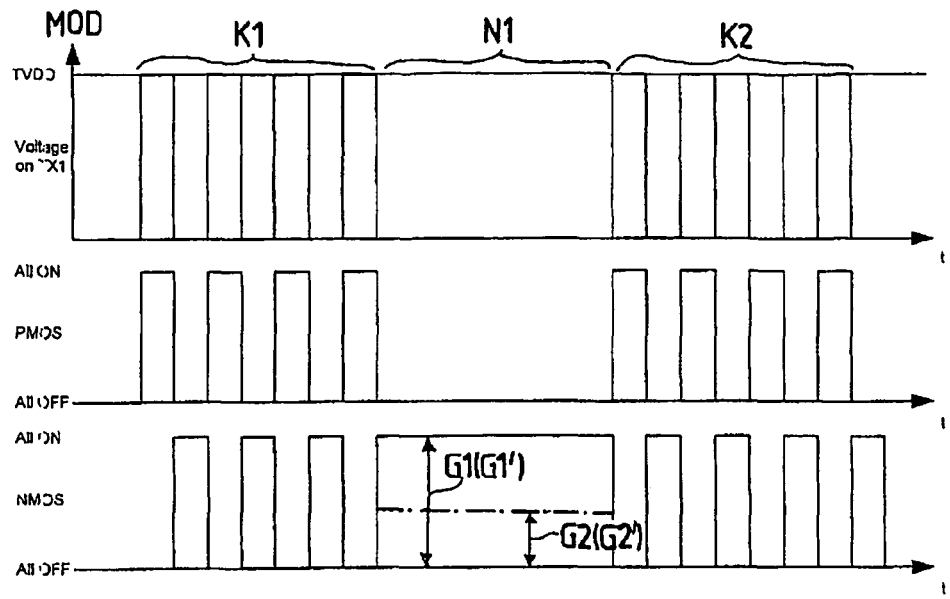
FIG. 5 shows, in the form of plots against time, signals that occur in the communication partner device shown in FIG. 3 when amplitude modulation of a carrier signal is carried out with a 100% degree of modulation.

A modulated carrier signal MOD (see the first plot against time at the top) is shown in sections in FIG. 5. Of the modulated carrier signal MOD, what are shown in FIG. 5 are two unmodulated carrier signal sections K1 and K2 and one modulated carrier signal section N1. To generate the unmodulated high-level carrier signal sections K1 and K2, what is done, in alternating succession, is that in a first half-cycle of the carrier signal all the PMOS transistors 22 are controlled to their conductive state of conduction (conductance is high) and all the NMOS transistors 21 are controlled to their blocked state of conduction (conductance is virtually zero), and in a succeeding half-cycle of the carrier signal all the PMOS transistors 22 are controlled to their blocked state of conduction (conductance is virtually zero) and all the NMOS transistors 21 are controlled to their conductive state of conduction (conductance is high). The second plot against time in the center of FIG. 5 and the third plot against time at the bottom of FIG. 5 should be referred to in this connection, in which plots against time the conductances mentioned are shown. To generate the modulated low-level carrier signal sections N1, all the PMOS transistors 22 are controlled to their blocked state of conduction (conductance is virtually zero) and a given number of the NMOS transistors 21 are controlled to a conductive state of conduction, this being done for the entire duration of the modulated low-level carrier signal section NI, as is likewise apparent from the second and third plots against time in FIG. 5. Of the NMOS transistors 21, all the transistors 21 could be controlled to their conductive state of conduction (conductance is high), in which case the main current paths of all the NMOS transistors 21 that are connected in parallel with one another would produce a total conductance G1, G1', as indicated by a double-headed arrow in FIG. 5. If all the NMOS transistors 21 were in fact controlled to their conductive state of conduction, this would correspond to the prior art that was described by reference to FIG. 1. In accordance with the invention however, in the solution according to the invention shown in FIG. 3, not all the NMOS transistors 21 are controlled to their conductive state of conduction (conductance is high) and instead only some of the NMOS transistors 21 are controlled to their conductive state of conduction (conductance is high), as a result of which, by means of the main current paths of the NMOS transistors 21 that are controlled to their conductive state of conduction, which current paths are connected in parallel with one another, a total conductance G2, G2' is obtained of the kind that is indicated by a dotted and dashed line and a double-headed arrow in FIG. 5. In the manner described above, an amplitude-modulated carrier signal MOD is obtained that has a degree of modulation of 100%. What is also achieved in the manner described above is that, by means of the NMOS stage 20, 20' formed by the NMOS transistors 21, a total conductance G2, G2' acting on the signal outputs TX1, TX2, and consequently a resistance value RW1, RW1' acting on the signal outputs TX1, TX2, is obtained, which latter can be transformed by means of the signal processing circuit 3 in such a way that a resistance value RW2, RW2' that is available for damping the transmission coil 7 in a suitable way can be obtained. In this way, advantageous damping of the transmission coil 7 is obtained during the period when the modulated sections of the carrier signal occur, i.e. during the modulated sections N1 of the carrier signal as well.

Figure 6:
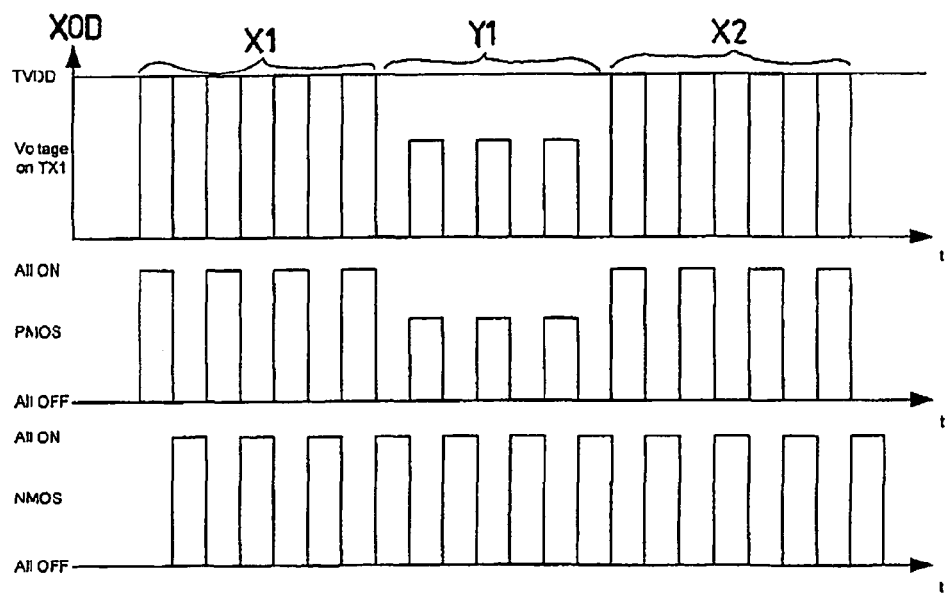
FIG. 6 shows, in a similar way to FIG. 5, signals that would occur in amplitude modulation of a carrier signal with a degree of modulation of 30% if amplitude modulation of this kind with a degree of modulation of 30% were carried out in the communication partner device shown in FIG. 3.

Merely for the sake of illustration, a modulated carrier signal XOD, which modulated carrier signal XOD has a degree of modulation of 30%, is shown in FIG. 6. To generate the unmodulated high-level carrier signal sections X1 and X2, what is done, in alternating succession, is that, per half-cycle of the carrier signal, all the PMOS transistors 22 are first controlled to their conductive state of conduction and all the NMOS transistors 21 are controlled to their blocked state of conduction, and then all the PMOS transistors 22 are controlled to their blocked state of conduction and all the NMOS transistors 21 are controlled to their conductive state of conduction (see the second and third plots against time). To generate the modulated low-level carrier signal sections Y1, what is done, in alternating succession, is that, per half-cycle of the carrier signal, only some of the PMOS transistors 22 are first controlled to their conductive state of conduction and all the NMOS transistors 21 are controlled to their blocked state of conduction, and then only some of the PMOS transistors 22 are controlled to their blocked state of conduction and all the NMOS transistors 21 are controlled to their conductive state of conduction (see the second and third plots against time), so that the main current paths of the PMOS transistors 22, which main current paths are connected in parallel with one another, produce a higher total resistance value, which results in a lower signal amplitude (see the first plot against time at the top).

In the communication partner device 1 shown in FIG. 3 there is a signal processing circuit 3 that is laid out symmetrically with respect to ground. This need not necessarily be the case because a one-sided non-symmetrical layout may also be selected, in which case the filter circuit 4 then contains only one series inductor and only one parallel capacitor, the matching circuit 5 contains only one series capacitor and only one parallel inductor and the damping stage 6 contains only one damping resistor.

The invention claimed is:

1. A transmission circuit comprising:
a data signal source for emitting data signals;
a carrier signal generator for generating a carrier signal, the carrier signal being subjected, in a transmitting mode, to amplitude modulation of a given degree of modulation in accordance with the data signals to be transmitted,
a modulation-control circuit for generating modulation-control signals that take account of the data signal,
a modulation circuit for generating the modulated carrier signal by modulating the carrier signal as a function of the modulation-control signals, the modulated carrier signal having unmodulated carrier signal sections and modulated carrier signal sections wherein the modulation circuit contains a circuit stage, the circuit stage being designed to produce a resistance value that acts on the signal output and can be transformed by a signal processing circuit, and
a signal output for emitting the modulated carrier signal, the signal output being intended to supply the signal processing circuit, wherein the modulation-control circuit is designed to generate different modulation control signals, and the circuit stage is designed to be controllable to produce a plurality of different resistance values that act on the signal output and wherein the different modulation-control signals are assigned to the different resistance values, each of the different resistance values is produced as a result of the different modulation-control signals being assigned to the resistance value concerned being fed to the circuit stage.

2. A transmission circuit as claimed in claim 1, wherein the modulation circuit comprises, a circuit stage for producing a plurality of different resistance values that act on the signal output, at least one transistor, the main current path of which is connected on the one hand to the signal output and on the other hand to a reference potential (ground) and by means of the main current path of which different resistance values can be produced.

3. A transmission circuit as claimed in claim 2, wherein the circuit stage for producing a plurality of different resistance values that act on the signal output has a plurality of NMOS transistors connected in parallel with one another.

4. A transmission circuit as claimed in claim 3, wherein the plurality of NMOS transistors connected in parallel with one another are connected in series with a plurality of PMOS transistors connected in parallel with one another, the PMOS transistors being intended to produce a plurality of further different resistance values that act on the signal output, are connected by their main current paths on the one hand to the main current paths of the NMOS transistors connected in parallel with one another and on the other hand to a source of d.c. voltage and are controllable by the modulation-control circuit.

5. A communication partner device for contactless transmission of data having A transmission mode and comprising:
a transmission circuit according to claim 1,
a signal processing circuit connected to the transmission circuit, the signal processing circuit being designed to transform resistance values, and
a transmission coil connected to the signal processing circuit.

* * * * *